United States Patent [19]

Scheffler

[11] 4,079,222
[45] Mar. 14, 1978

[54] CONTINUOUS HEATING INDUCTION FURNACE

[75] Inventor: Friedrich Scheffler, Remscheid, Germany

[73] Assignee: AEG-Elotherm, G.m.b.H., Remscheid-Hasten, Germany

[21] Appl. No.: 727,141

[22] Filed: Sep. 27, 1976

[30] Foreign Application Priority Data

Oct. 17, 1975  Germany .............................. 2546563

[51] Int. Cl.$^2$ .............................................. H05B 5/02
[52] U.S. Cl. .................................................. 219/10.69
[58] Field of Search ............. 219/10.69, 10.71, 10.41, 219/10.67, 10.79, 10.73, 10.75; 266/129, 132, 133; 214/23, 26

[56] References Cited

U.S. PATENT DOCUMENTS

| 2,959,660 | 11/1960 | Schmidt | 219/10.69 |
| 3,596,036 | 7/1971 | Ross et al. | 219/10.69 |

FOREIGN PATENT DOCUMENTS

| 585,178 | 10/1959 | Canada | 219/10.69 |
| 1,262,844 | 4/1961 | France | 219/10.69 |
| 771,395 | 4/1957 | United Kingdom | 219/10.69 |

*Primary Examiner*—Bruce A. Reynolds
*Attorney, Agent, or Firm*—Cushman, Darby & Cushman

[57] ABSTRACT

A continuous heating induction furnace in which workpieces are mounted on a receiver for step-wise movement from a furnace inlet to outlet through a longitudinally extending chamber. A pair of lifter rods extend through bores at the chamber floor to engage the workpieces at each of a plurality of stops or stations and are in turn rigidly connected to a bar element extending below the chamber. The receiver reciprocates along the longitudinal direction while the lifter rods elevate the workpieces during backward receiver movement. The receiver is formed as a pair of tubes which engage bearings mounted at separated locations along the chamber so that the length of the chamber is not limited by the sag characteristics of the receiver.

4 Claims, 2 Drawing Figures

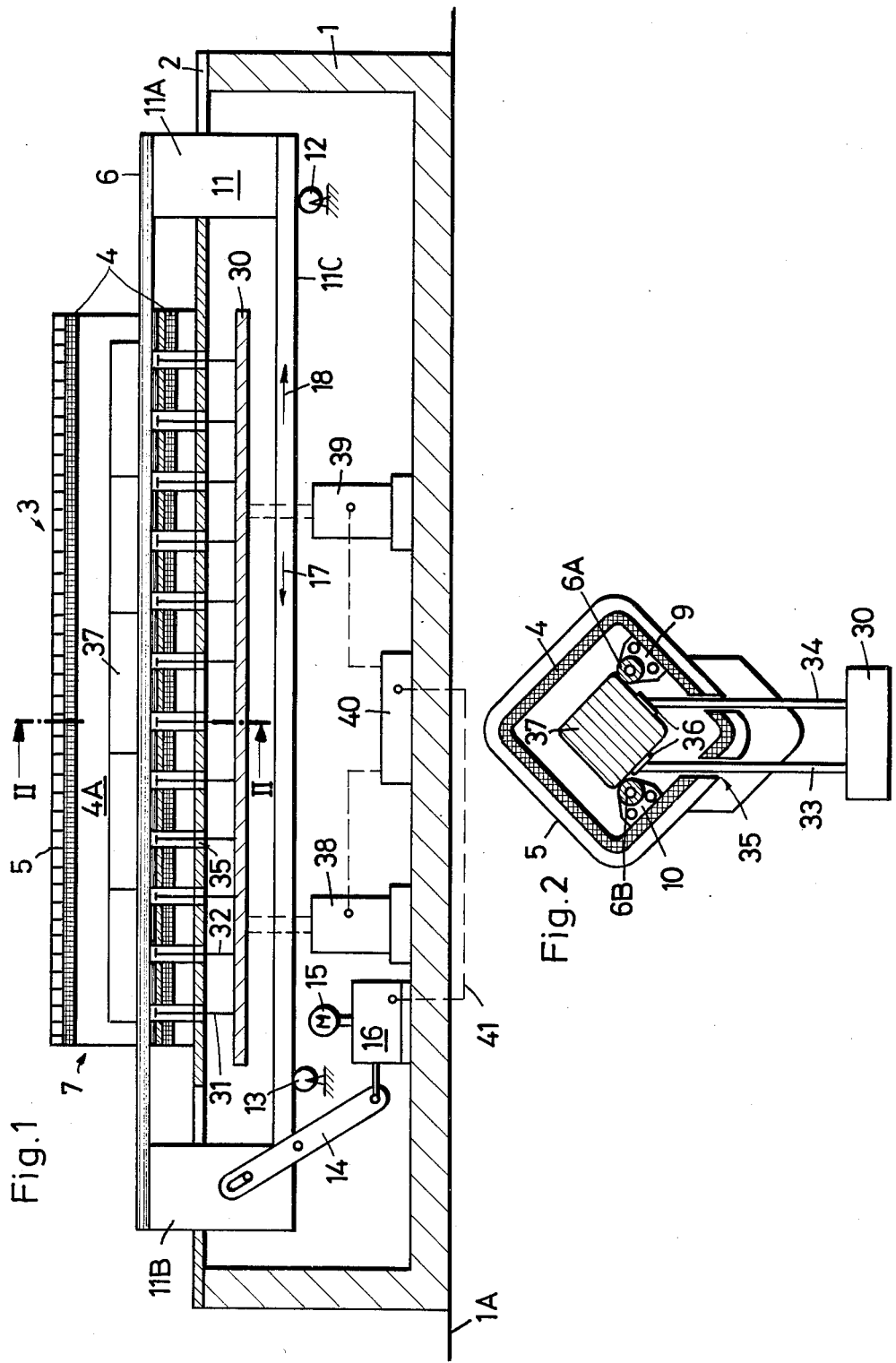

CONTINUOUS HEATING INDUCTION FURNACE

The invention relates to a continuous heating induction furnace with step-wise transportation of workpieces through the furnace chamber, whereby the workpieces are transported by a motor driven workpiece receiver which extends in the direction of transportation and is reciprocally moveable in the furnace chamber, which receiver transports the individual workpieces in the direction of transportation between stops or stations for the workpieces which are locally fixed on the path of the workpieces, and then carries out a return movement counter to the direction of transportation while the workpieces remain at the stops.

In known furnaces of this type, the transport apparatus includes a so-called "lifter" at each stop which extends the entire length of the furnace chamber and can be motor driven on the two front sides of the continuous heating furnace by way of proper mechanical driving means. The lifter first carries out a lifting movement transverse to the direction of transportation by reaching from below through a workpiece storing device and lifting the workpiece stored at each station. Then the lifter moves in the direction of transportation, and deposits each workpiece on the next station. The lifter then executes a return movement below the workpieces to its original starting position, from which the above cycle is repeated.

These known continuous heating furnaces suffer from the defect of a short overall length, since the lifter length is limited because of bending of the beam. For furnaces longer than a certain length, the lifter dimensions required to provide sag-stability are too large to be accommodated by the diameter of the induction coils encircling the workpiece passage.

Therefore, it has been known to serially connect several continuous-heating furnaces of the above mentioned kind in succession. However, some distance must remain between the individual furnace chambers. As a result, each workpiece is not heated as it leaves one furnace and is fed to the inlet of the other furnace. Therefore, such installations provide unsatisfactory heating.

The present invention deals with the task of improving continuous heating induction furnaces of this kind in such a way that no disturbing sag of the receiver for the workpiece, mounted movably in the direction of transportation, will occur with increasing length of the furnace chamber, and that over-dimensioning of the receiver of the workpiece to avoid sag can be avoided.

According to the invention, this task is solved by a continuous heating induction furnace wherein the receiver for the workpiece is mounted for longitudinal translation in bearings, in that the stops for the workpieces are mounted at a distance from each other on the workpiece path so that the workpieces can be perpendicularly lifted in relation to the direction of transportation from the receiver, and that the individual stops for the workpieces can be synchronously driven by a motor by means of a drive, counter to the movement of the workpiece receiver in order to carry out a lifting movement.

At the same time, the present invention is advantageous in that all stops for workpieces, which are mounted so they can be lifted, can be synchronously driven. This is accomplished by a common driving element which extends along the workpiece receiver outside of and beside the furnace chamber and is rigidly connected with the individual workpiece stops.

The attached drawing serves for the explanation of a preferred embodiment of the invention.

FIG. 1 shows a continuous heating induction furnace of the invention schematically in side view, partly in section.

FIG. 2 shows details of the arrangement of FIG. 1, along the sectional plane II—II, which plane runs perpendicularly to the plane of presentation of FIG. 1.

In FIG. 1, numeral 1 designates a frame-like support which is disposed on a foundation 1A, and with a base plate 2 which mounts induction coils 3. Coil 4 of the furnace consists of a larger number of serially connected coil windings which define furnace space 4A along the direction of transportation of the workpieces passing the furnace. Coils 4, e.g., in FIG. 2, have a square cross section and are each encircled by a housing jacket 5. The furnace chamber 4A is filled completely by an elongated workpiece receiver 6, which consists of two metal tubes 6A and 6B, running at a slight distance from the inside wall of the coil, which can be connected by way of flexible feed lines, consisting of insulating material (not shown) for circulation of cooling water.

Tubes 6A and 6B serve as receivers for the workpieces and are mounted in roller bearings 9 and 10, which are attached to the inside walls of the coils 4 in a number dependent on the length of the continuous heating furnace along the length of the tubes 6A and 6B at a distance from one another in the furnace chamber 4A for permitting an almost frictionless shifting of the tubes in the longitudinal direction.

For this purpose, tubes 6A and 6B are articulated to a frame-like support 11, which is mounted in roller bearings 12 and 13 which bearings are adjustable in the direction of transportation through the continuous heating furnace. A two armed lever 14 is articulated movably to the support 11, which lever can be operated by means of an electric motor 15 via a gear system 16, so that the rotational movement of the driving shaft of the motor 15 is converted into a swivelling movement of the lever 14 around its rotational axis so that the support 11 is reciprocally moved in its bearings 12 and 13 in the direction of the arrows 17 and 18.

Support 11 consists of two parts — 11A and 11B — penetrating corresponding recesses of the base plate 2, which are interconnected below the base plate 2 by a part 11C which extends along the length of the continuous-heating furnace beside the outside jacket 5 of the furnace.

A bar element 30 is mounted for lifting motion perpendicularly to the base surface of the support 1 and serves as a carrier of a larger number of rods 31, 32 . . . N. Each workpiece stop consists of two rods, e.g., 33 and 34, connected rigidly with construction element 30, each of which penetrates a bore, e.g., 35, in the housing 5 of the furnace arrangement 3. Each rod, e.g., 33 and 34 at the same time extends past two adjacent windings of the coil 4, into the furnace chamber 4A and on their ends facing the furnace space are equipped with support elements, e.g., 36, which mount a metal workpiece 37 having the shape of a small block.

The numerals 38 and 39 designate two synchronously operable, hydraulic piston motors, which engage element 30 and shift it transversely to the direction of transportation of the support 6A, 6B of the workpiece, i.e., in a vertical direction. Motors 38 and 39 can be operated by means of a common conventional control apparatus 40, which apparatus obtains its control signal via a control line 41 from a control arrangement disposed in the gear box 16. The control signal is derived from the position of a part of the gearing 16 indicating the movement of the lever 14.

The described arrangement operates as follows. The workpieces 37 are fed to the continuous heating furnace 3 by placing them on tubes 6A and 6B at the inlet 7 of furnace chamber 4A. At the same time, receiver 11 is shifted by motor 15 in the direction of the arrow 18, as a result of which a workpiece that is to be heated is introduced into the furnace chamber 4A. At the end of the forward movement, a control pulse is fed via the control line 41 to the control arrangement 40, which causes motors 38 and 39 to carry out a lifting movement. At the same time all rods, e.g., 33, 34, etc., are pushed into the furnace chamber, and a workpiece 37 located above the workpiece stops on the workpiece tubes 6A and 6B, is lifted off the workpiece tube into a position above the tubes by the workpiece stops. In this position, the motors 38 and 39 are stopped, and now, receiver 11 is moved back in the direction of the arrow 17, into its original starting position in the operating cycle of the driving gear system 15 and 16. In this position, a pulse on the control line 41 causes the control device 40 and the driving motors 38 and 39, to carry out a lowering movement for the rods 33 and 34 as a result of which the workpieces 37 on the stop is again deposited on the workpiece tubes 6A and 6B. The stops for the workpiece, at the same time, are moved back into their original starting position and the motors 38 and 39 are stopped.

After this process, the receiver 11 is again shifted in the direction of arrow 18, as a result of which the workpiece 37 is again transported in the direction of passage of the continuous heating furnace. After this process, the operational cycle of the remaining construction elements of the transportation arrangement is repeated as described above.

The arrangement described has the advantage, that the furnace 3 can be of relatively great length, without any essential bending stress on the workpiece tubes 6A, and 6B. Another advantage is that the rod-shaped workpiece stops only require a small space between the individual windings of coils of the induction coil arrangement 4, so that the furnace can be equipped with a passage and a furnace chamber closed within itself.

Many changes and modifications in the above described embodiment of the invention can be carried out without departing from the scope of the invention. For example, the roller bearings 12 and 13 can be replaced by friction bearings. Accordingly, the scope of the invention is intended to be limited only by the scope of the appended claims.

What is claimed is:

1. A continuous heating induction furnace comprising:

means defining a longitudinally extending furnace chamber;

induction heating coil means adjacent to the walls of said chamber for heating a workpiece within said chamber;

a workpiece receiver for mounting a plurality of workpieces and extending in said chamber in a longitudinal direction;

means for reciprocally driving said receiver backward and forward along said longitudinal direction in said chamber;

a plurality of bearings mounted at separated intervals in said chamber along said longitudinal direction for supporting said receiver;

a plurality of lifter means each disposed at a longitudinally separated stop within said chamber for engaging a workpiece to lift that workpiece out of engagement with said receiver during backward movement of said receiver;

means connecting said lifter means together for synchronous movement; and drive means for operating said lifting means synchronously with longitudinal movement of said receiver to cause stepwise movement of said workpieces through said chamber in said longitudinal direction.

2. A furnace as in claim 1, further including a plurality of induction coils disposed about said chamber.

3. A furnace as in claim 1 wherein each said lifting means includes a plurality of rod pairs extending through bores into said chamber to engage said workpieces and said connecting means includes a bar element extending below said chamber and rigidly mounting said rod pairs and said drive means includes at least one motor for moving said bar element, rod pairs and engaged workpieces vertically, means for producing a signal indicating the direction of said receiver and control means for operating said motor in synchronization with the direction of said receiver.

4. A furnace as in claim 1 wherein said receiver includes a pair of tubes extending on either side of the engaged workpieces.

* * * * *